(12) United States Patent
Chen

(10) Patent No.: US 7,687,159 B2
(45) Date of Patent: Mar. 30, 2010

(54) MAGNETIC RECORDING MEDIUM AND METHOD FOR MANUFACTURING SAME

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 958 days.

(21) Appl. No.: 11/410,303

(22) Filed: Apr. 24, 2006

(65) Prior Publication Data

US 2006/0257695 A1    Nov. 16, 2006

(30) Foreign Application Priority Data

May 13, 2005    (CN) .................... 2005 1 0034648

(51) Int. Cl.
*G11B 5/66* (2006.01)
(52) U.S. Cl. ..................................... 428/832
(58) Field of Classification Search ............. None
See application file for complete search history.

(56) References Cited

U.S. PATENT DOCUMENTS

| | | | |
|---|---|---|---|
| 5,942,342 A * | 8/1999 | Hikosaka et al. ......... 428/832.1 |
| 6,835,330 B2 * | 12/2004 | Nishino et al. ............. 252/503 |
| 7,014,882 B2 | 3/2006 | Ataka et al. |
| 7,022,424 B2 | 4/2006 | Kamisawa |
| 2004/0071951 A1 * | 4/2004 | Jin ............................ 428/323 |
| 2005/0068679 A1 * | 3/2005 | Chen ......................... 360/131 |
| 2007/0054154 A1 * | 3/2007 | Leu .......................... 428/836.3 |
| 2007/0237987 A1 * | 10/2007 | Winarski .................. 428/836.3 |

* cited by examiner

*Primary Examiner*—Holly Rickman
(74) *Attorney, Agent, or Firm*—Clifford O. Chi

(57) ABSTRACT

A magnetic recording medium (10) includes a nonmagnetic substrate (1), an anti-ferromagnetic layer (2) arranged on the nonmagnetic substrate, and a magnetic recording layer (3) formed on the anti-ferromagnetic layer. The magnetic recording layer comprises a plurality of carbon nanotubes (31) extending perpendicularly from the anti-ferromagnetic layer and a plurality of magnetic nano-particles (32) contained inside the carbon nanotubes. A method of manufacturing a magnetic recording medium, according to one preferred embodiment, includes providing a nonmagnetic substrate; arranging an anti-ferromagnetic layer on the nonmagnetic substrate; forming a plurality of carbon nanotubes extending perpendicularly from the anti-ferromagnetic layer; and forming a plurality of magnetic nano-particles contained in the carbon nanotubes. The present magnetic recording medium can decrease noise, improve bit storage density, and has excellent thermal stability.

14 Claims, 4 Drawing Sheets

MAGNETIC RECORDING MEDIUM AND METHOD FOR MANUFACTURING SAME

BACKGROUND

1. Field of the Invention

The present invention relates to magnetic recording media and, more particularly, to a high storage capacity magnetic recording medium. The present invention also relates to a method for manufacturing magnetic recording medium.

2. Discussion of the Related Art

Nowadays, magnetic recording media are widely used, for example, in various personal computers or working stations. Generally, magnetic recording media can be classified into longitudinal magnetic recording media, perpendicular magnetic recording media and hybrid magnetic recording media.

With the rapid development of information technology, it is critical to fabricate magnetic recording media with very high information bit storage densities. Generally a magnetic storage medium is formed of ferromagnetic particles, when the size of the ferromagnetic particles is reduced the information bit storage density of the magnetic recording media can be increased. However, when the ferromagnetic particles are reduced to a size smaller than the size of a single magnetic domain, the distances between the neighboring ferromagnetic particles are very small, thus exchange couplings between neighboring ferromagnetic particles become significant, and the resulting noise is very large making data writing/reading unsuccessfully. When the ferromagnetic particles have a very small size, the magnetic anisotropy related to the volume of the particles is decreased. This decrease causes poor thermal stability in the magnetic recording medium. Therefore, the magnetic particles that can be used are limited to those above a certain size, and information storage capacity of the magnetic recording media is resultingly limited. Thus the conventional magnetic recording media cannot satisfy needs of high storage capability.

What is needed, therefore, is a magnetic recording medium with high information bit storage density and thermal stability, and a method of manufacturing the same.

SUMMARY

A magnetic recording medium according to one preferred embodiment includes a nonmagnetic substrate, an anti-ferromagnetic layer arranged on the nonmagnetic substrate, and a magnetic recording layer formed on the anti-ferromagnetic layer. The magnetic recording layer is comprised of a plurality of carbon nanotubes extending perpendicularly from the anti-ferromagnetic layer and a plurality of magnetic nano-particles each contained in their respective carbon nanotubes.

A method of manufacturing a magnetic recording medium, according to one preferred embodiment, includes following steps: providing a nonmagnetic substrate; arranging an anti-ferromagnetic layer on the nonmagnetic substrate; forming a plurality of carbon nanotubes extending perpendicularly from the anti-ferromagnetic layer, and forming a plurality of magnetic nano-particles contained in the carbon nanotubes.

Compared with conventional magnetic recording medium, the present magnetic recording medium has following advantages. Because the carbon nanotubes are used, a tube wall of the carbon nanotubes can be utilized as grain boundaries for the magnetic nano-particles, and each carbon nanotube including magnetic nano-particles can serve as a magnetic recording unit, the noise can be effectively reduced, which is caused by exchange coupling in the magnetic particles. Further because the anti-ferromagnetic layer is used, the coupling between the magnetic recording layer and anti-ferromagnetic layer is strengthened, thus the magnetic property cannot be affected by thermal stability or thermal decay. Therefore, the magnetic recording medium has excellent thermal properties. Furthermore, there is no need to include a carbon overcoat on the magnetic recording layer to achieve good thermal properties, thus a writing/reading head can get direct contact with the magnetic recording layer without loss due to separation.

Other advantages and novel features will become more apparent from the following detailed description of present magnetic recording medium, when taken in conjunction with the accompanying drawings.

BRIEF DESCRIPTION OF THE DRAWINGS

Many aspects of the present magnetic recording medium can be better understood with reference to the following drawings. The components in the drawings are not necessarily to scale, the emphasis instead being placed upon clearly illustrating the principles of the present magnetic recording medium. Moreover, in the drawings, like reference numerals designate corresponding parts throughout the several views.

DETAILED DESCRIPTION OF PREFERRED EMBODIMENTS

Reference will now be made to the drawings to describe preferred embodiments of the present magnetic recording medium, in detail.

Figure 1:
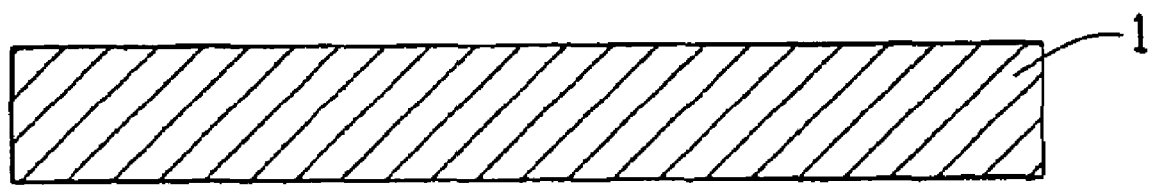
FIG. 1 is a schematic, cross-sectional view of a substrate for manufacturing a magnetic recording medium in accordance with a preferred embodiment.
Figure 2:
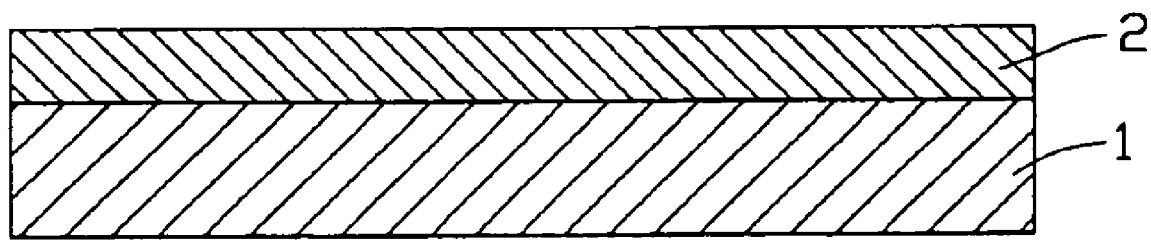
FIG. 2 is similar to FIG. 1, but showing an anti-ferromagnetic layer deposited on the substrate of FIG. 1.
Figure 3:
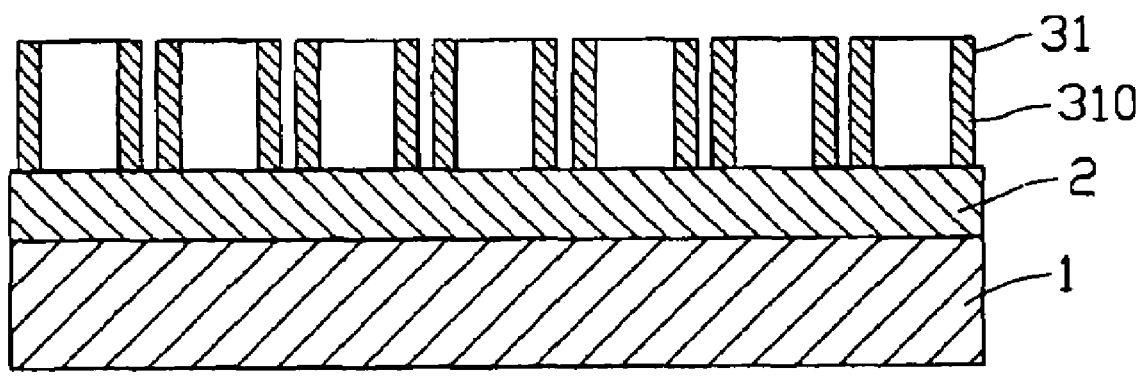
FIG. 3 is similar to FIG. 2, but showing a number of carbon nanotubes grown on the anti-ferromagnetic layer of FIG. 2.
Figure 4:
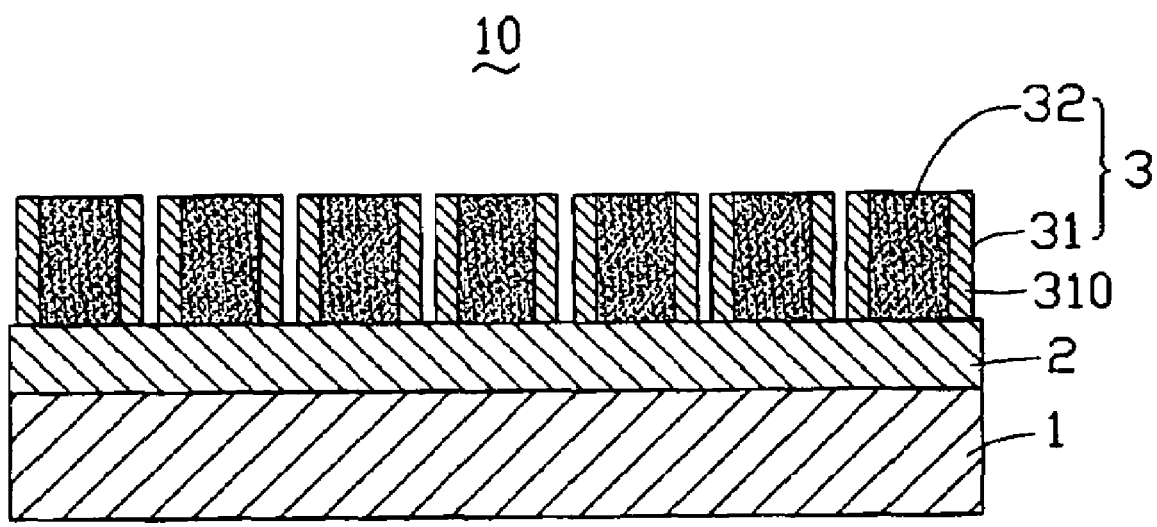
FIG. 4 is a schematic, cross-sectional view of the magnetic recording medium having a number of magnetic particles in the carbon nanotubes of FIG. 3.

Referring initially to FIG. 4, a magnetic recording medium 10 in accordance of a preferred embodiment is shown. The magnetic recording medium 10 includes a substrate 1, an anti-ferromagnetic layer 2 arranged on the substrate 1, and a magnetic recording layer 3 formed on the anti-ferromagnetic layer 2.

The substrate 1 is made of a nonmagnetic material, such as glass, an aluminum plate having a nickel phosphide (NiP) film thereon.

The anti-ferromagnetic layer 2 can be made from anti-ferromagnetic material, such as cobalt oxide (CoOx), nickel oxide (NiOx), and iron oxide (FeOx). A thickness of the anti-ferromagnetic layer 2 is generally in the range from 50 nanometers to 200 nanometers.

The magnetic recording layer 3 comprises a plurality of carbon nanotubes 31 containing a plurality of magnetic nano-particles 32 therein. In the illustrated embodiment, the carbon nanotubes 31 are parallel to each other and extending perpendicularly from the anti-ferromagnetic layer 2. A height of the carbon nanotubes 31 is in a range from 10 nm to 100 nm, preferably 10 nm to 50 nm. A height of the magnetic recording layer 3 is determined by the height of the carbon nanotubes 31. The carbon nanotubes can be single-walled nanotubes, multi-walled nanotubes, or a combination thereof. Each of the carbon nanotubes 31 has a tube wall 310 and an inner space defined therein for accommodating the magnetic nano-particles 32. Advantageously, a thickness of the tube wall 310 is in the range from 2 nm to 20 nm, and an inner diameter of the carbon nanotube 31 is in the range from 5 nm to 50 nm. A diameter of the magnetic nano-particles 32 is slightly less than the inner diameter of the carbon nanotubes 31, in the range from 5 nm to 50 nm. Each magnetic nano-particles 32 is filled in a carbon nanotube 31 respectively. The magnetic nano-particles 32 can be made from a magnetic material selected from the group consisting of CoCr, CoX, CoCrY, CoCrYZ, etc., wherein, X is selected from the group consisting of Ni, P and Fe, Y is selected from the group consisting of Ta, Pt, Pd and Mo, and Z is selected from the group consisting of N, O, P and Ar.

Compared with conventional magnetic recording media, the present magnetic recording medium 10 has following advantages. Because the carbon nanotubes 31 are used, the tube wall 310 of the carbon nanotubes 31 can be utilized as grain boundary of the magnetic nano-particles 32, and each carbon nanotubes 31 containing a magnetic nano-particle 32 can serve as a magnetic recording unit, the noise caused by exchange coupling in the magnetic nano-particles 32 can be effectively reduced. Furthermore, the size of each magnetic recording unit is the sum of two tube walls of a carbon nanotube 31 and a magnetic nano-particle 32, that is, the size of each magnetic recording unit is in the range from 9 nm to 90 nm. Therefore, the magnetic recording density can reach to 1000 Giga-bits per square inches. When the size of each magnetic recording unit is 10 nm, the magnetic recording density can reach to 2500 Giga-bits per square inches.

Because the anti-ferromagnetic layer 2 is used, the coupling between the magnetic recording layer 3 and anti-ferromagnetic layer 2 is strengthened, thus the magnetic property will not be influenced by thermal stability or thermal decay. Therefore, the magnetic recording medium 10 has an excellent thermal property.

Furthermore, the carbon nanotube 31 has an excellent mechanical strength and good thermal property. Both mechanical and thermal properties of the carbon nanotube 31 are better than diamond. Therefore, a carbon overcoat is not needed to cover the magnetic recording layer 3 for protecting the magnetic recording layer 3, thus, a writing/reading head can get direct contact with the magnetic recording layer 3 without spacing loss.

Referring to FIG. 1 to FIG. 4, a method of manufacturing the magnetic recording medium 10, in accordance with a second embodiment, is shown. The method includes following steps:

providing a nonmagnetic substrate;
arranging an anti-ferromagnetic layer on the substrate;
forming a plurality of carbon nanotubes extending perpendicularly from the anti-ferromagnetic layer; and
forming a plurality of magnetic nano-particles contained in the carbon nanotubes.

The first step is to provide a substrate 1. The substrate 1 is made from nonmagnetic material, such as glass, an aluminum plate having a nickel phosphide (Nip) film thereon (NiP/Al), etc. In this embodiment, a glass substrate is utilized as the substrate 1.

The second step is to arrange an anti-ferromagnetic layer 2 on the substrate 1. The anti-ferromagnetic layer 2 is made from anti-ferromagnetic material, such as CoOx, NiOx, or FeOx. The anti-ferromagnetic layer 2 can be deposited by an evaporation process or a reactive sputtering process with Ar (argon) and oxygen gas. In this embodiment, the reactive sputtering process is utilized to create the anti-ferromagnetic layer 2. The substrate 1 is arranged in a vacuum reaction chamber, and Ar gas plus oxygen gas is filled in the vacuum reaction chamber, which Ar gas is utilized as a protecting gas and oxygen gas is utilized as a reaction gas. The cobalt material in the vacuum reaction chamber is bombarded by laser beam, and then a CoOx film is formed on the substrate 1. The CoOx film is served as the anti-ferromagnetic layer 2, and a thickness of the CoOx film can be controlled by controlling the deposited time. The thickness of the CoOx film is in the range from 50 nm to 200 nm.

The third step is to form a plurality of carbon nanotubes 31 on the anti-ferromagnetic layer 2. The anti-ferromagnetic layer 2 is utilized as a catalyst layer, and a number of carbon nanotubes 31 is formed by a process selected from the group consisting of thermal chemical vapor deposition, plasma enhanced chemical vapor deposition, and microwave plasma chemical vapor deposition. A plurality of carbon nanotubes 31 are arranged parallel to each other and extending perpendicularly from the anti-ferromagnetic layer. Controlling the condition of the deposition, the carbon nanotubes 31 can be single-walled nanotubes, multi-walled nanotubes or a combination thereof. In this embodiment, the carbon nanotube 31 are single-walled nanotubes. Furthermore, the inside diameter of the carbon nanotube 31 is in the range from 5 nm to 50 nm, the height is in the range from 10 nm to 100 nm, preferably 10 nm to 50 nm, and the tube wall thickness is in the range from 2 nm to 20 nm.

The last step is to form magnetic nano-particles 32 contained in the carbon nanotubes 31. The diameter of the magnetic nano-particles 32 corresponds to the inside diameter of the carbon nanotubes 31. Each magnetic nano-particle 32 is also contained in a carbon nanotube 31 correspondingly. The magnetic nano-particles 32 can be deposited by a process selected from a group consisting of electrode-less plating, direct current magnetron sputtering, and radio frequency sputtering. The magnetic nano-particles 32 can be made from magnetic material, such as CoCr, CoX, CoCrY, CoCrYZ, etc. X is selected from the group consisting of Ni, P and Fe (where Ni is nickel, P is phosphorous and Fe is iron), Y is selected from the group consisting of Ta, Pt, Pd and Mo (where Ta is tantalum, Pt is platinum, Pd is palladium and Mo is Molybdenum), Z is selected from the group consisting of N, 0, P and Ar (where N is nitrogen, O is oxygen, P is phosphorous and Ar is argon). Because the inside diameter of the carbon nanotubes 31 is in the range from 5 nm to 50 nm, the height is in the range of 10 nm to 100 nm, preferably 10 nm to 50 nm, the diameter of the magnetic nano-particles 32 is in the range from 5 nm to 50 nm, the height is in the range of 10 nm to 100 nm, preferably 10 nm to 50 nm.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A magnetic recording medium, comprising:
a nonmagnetic substrate;
an anti-ferromagnetic layer arranged on and in contact with the nonmagnetic substrate wherein the anti-ferromagnetic layer is made of an anti-ferromagnetic material selected from the group consisting of cobalt oxide, nickel oxide, and iron oxide; and
a magnetic recording layer formed on the anti-ferromagnetic layer, the magnetic recording layer comprising a plurality of carbon nanotubes extending perpendicularly from the anti-ferromagnetic layer and a plurality of magnetic nano-particles contained in the carbon nanotubes.

2. The magnetic recording medium as claimed in claim 1, wherein the nonmagnetic substrate is made of glass.

3. The magnetic recording medium as claimed in claim 1, wherein the nonmagnetic substrate is an aluminum plate having a nickel phosphide film thereon.

4. The magnetic recording medium as claimed in claim 1, wherein a thickness of the anti-ferromagnetic layer is in the range from 50 nm to 200 nm.

5. The magnetic recording medium as claimed in claim 1, wherein the carbon nanotubes are single-walled nanotubes, multi-walled nanotubes, or a combination thereof.

6. The magnetic recording medium as claimed in claim 1, wherein each of the carbon nanotubes further comprises a tube wall and an inner space defined therein for accommodating the magnetic nano-particles.

7. The magnetic recording medium as claimed in claim 6, wherein a thickness of the tube wall is in the range from 2 nm to 20 nm.

8. The magnetic recording medium as claimed in claim 6, wherein an inner diameter of the carbon nanotube is in the range from 5 nm to 50 nm.

9. The magnetic recording medium as claimed in claim 8, wherein a diameter of one of the magnetic nano-particles is slightly less than the inner diameter of the corresponding carbon nanotube.

10. The magnetic recording medium as claimed in claim 1, wherein a height of the carbon nanotubes is in the range from 10 nm to 100 nm.

11. The magnetic recording medium as claimed in claim 10, wherein a height of the magnetic nano-particles received in the carbon nanotubes is in the range from 10 nm to 100 nm.

12. The magnetic recording medium as claimed in claim 1, wherein a height of the carbon nanotubes is in the range from 10 nm to 50 nm.

13. The magnetic recording medium as claimed in claim 12, wherein a height of the magnetic nano-particles received in the carbon nanotubes is in the range from 10 nm to 50 nm.

14. The magnetic recording medium as claimed in claim 1, wherein the magnetic nano-particles are made of a magnetic material selected from the group consisting of CoCr, CoX, CoCrY, and CoCrYZ; and X is selected from the group consisting of the elements Ni, P and Fe, Y is selected from the group consisting of the elements Ta, Pt, Pd and Mo, and Z is selected from the group consisting of the elements N, O, P and Ar.

* * * * *